United States Patent
Bhattiprolu et al.

(10) Patent No.: US 8,509,414 B2
(45) Date of Patent: Aug. 13, 2013

(54) PHONE CALL SCREENING

(75) Inventors: Sukadev Bhattiprolu, Beaverton, OR (US); Haren Myneni, Tigard, OR (US); Badari Pulavarty, Beaverton, OR (US); Chandra Seetharaman, Portland, OR (US); Narasimha N. Sharoff, Beaverton, OR (US); Malahal R. Naineni, Tigard, OR (US)

(73) Assignee: International Business Machines Corporation, Armonk, NY (US)

( * ) Notice: Subject to any disclaimer, the term of this patent is extended or adjusted under 35 U.S.C. 154(b) by 1179 days.

(21) Appl. No.: 12/202,380

(22) Filed: Sep. 1, 2008

(65) Prior Publication Data

US 2010/0054443 A1    Mar. 4, 2010

(51) Int. Cl.
*H04M 3/42*    (2006.01)
(52) U.S. Cl.
USPC ................... 379/213.01; 379/211.01
(58) Field of Classification Search
USPC ............. 379/211.01, 211.02, 213.01, 221.14
See application file for complete search history.

(56) References Cited

U.S. PATENT DOCUMENTS

| | | | |
|---|---|---|---|
| 6,718,028 B2* | 4/2004 | Culli et al. | 379/221.01 |
| 2005/0254636 A1* | 11/2005 | Niwa | 379/201.01 |
| 2006/0126810 A1* | 6/2006 | Wilson et al. | 379/142.01 |

* cited by examiner

*Primary Examiner* — Ahmad Matar
*Assistant Examiner* — Nafiz E Hoque
(74) *Attorney, Agent, or Firm* — Steven L. Bennett

(57) ABSTRACT

A target phone number previously associated with a first user is presently associated with a second user such that the target phone number is not presently associated with the first user. A caller uses a calling phone number to initiate a phone call to the target phone number. In response, it is determined whether the calling phone number is on a list of phone numbers associated with the first user. If the calling phone number is on the list of phone numbers associated with the first user, then the caller is notified that the target phone number is no longer associated with the first user. It is determined whether the caller wants to continue with the phone call, and if not, the phone call is terminated before it reaches the second user.

13 Claims, 5 Drawing Sheets

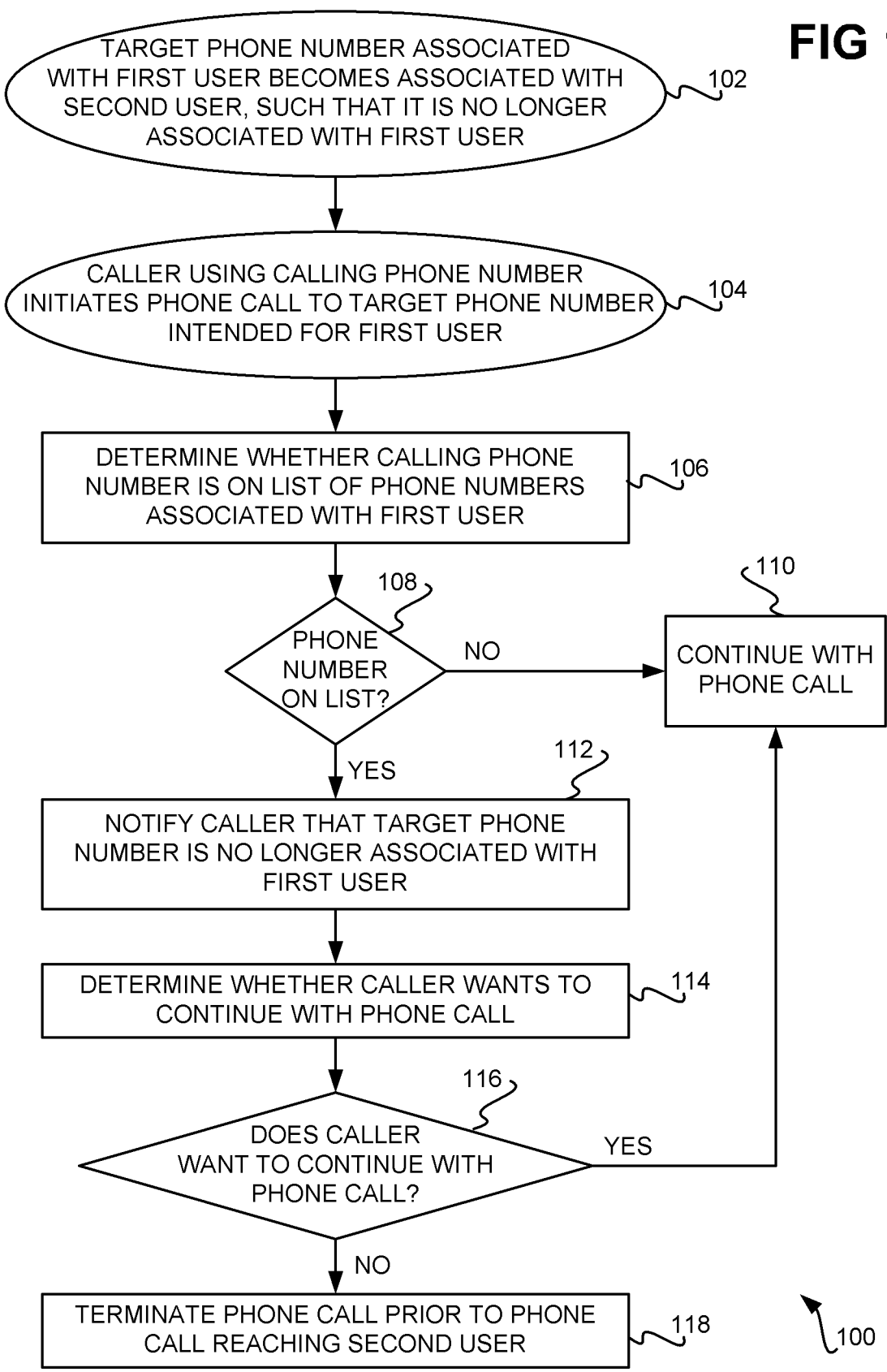

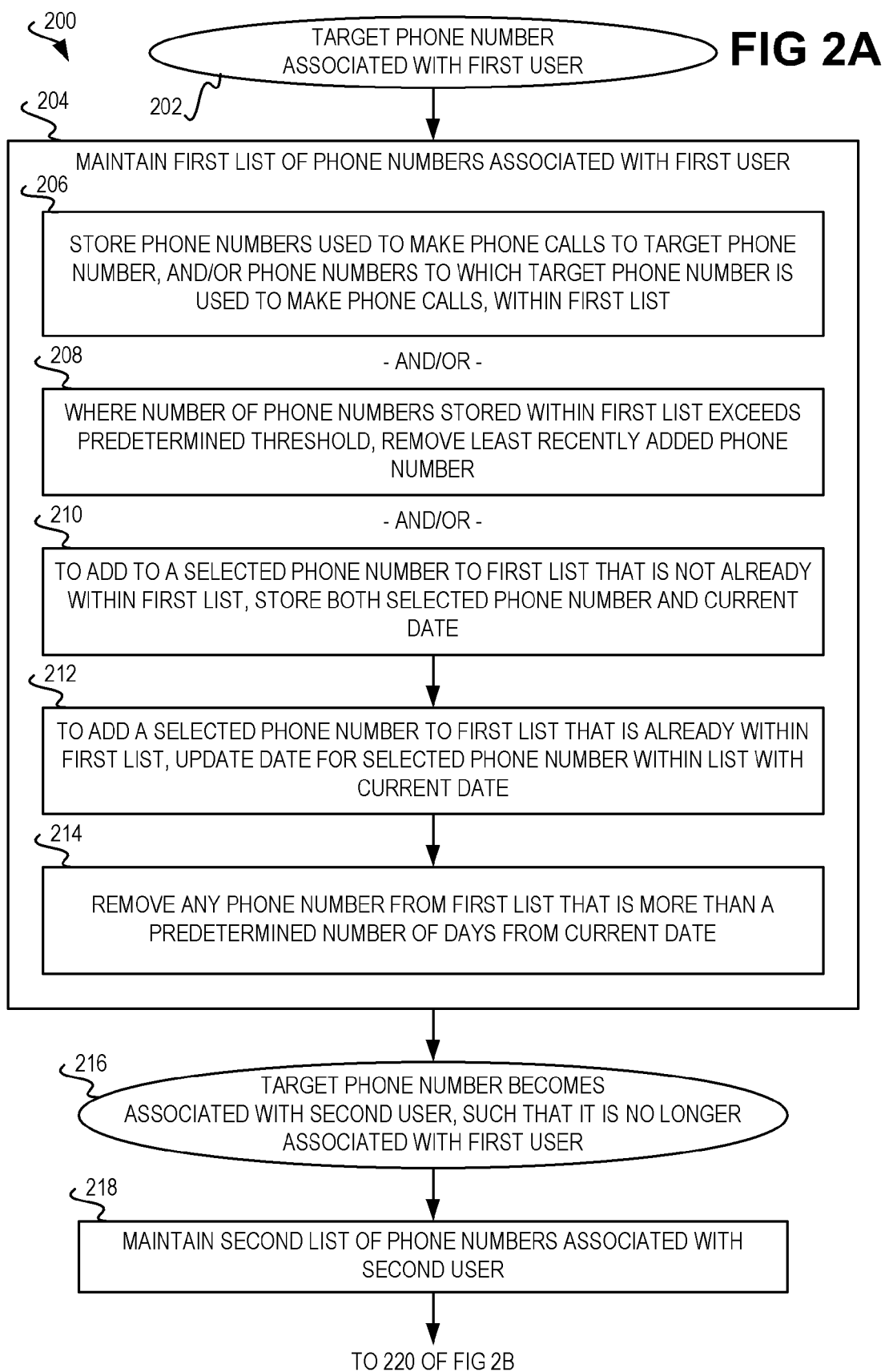

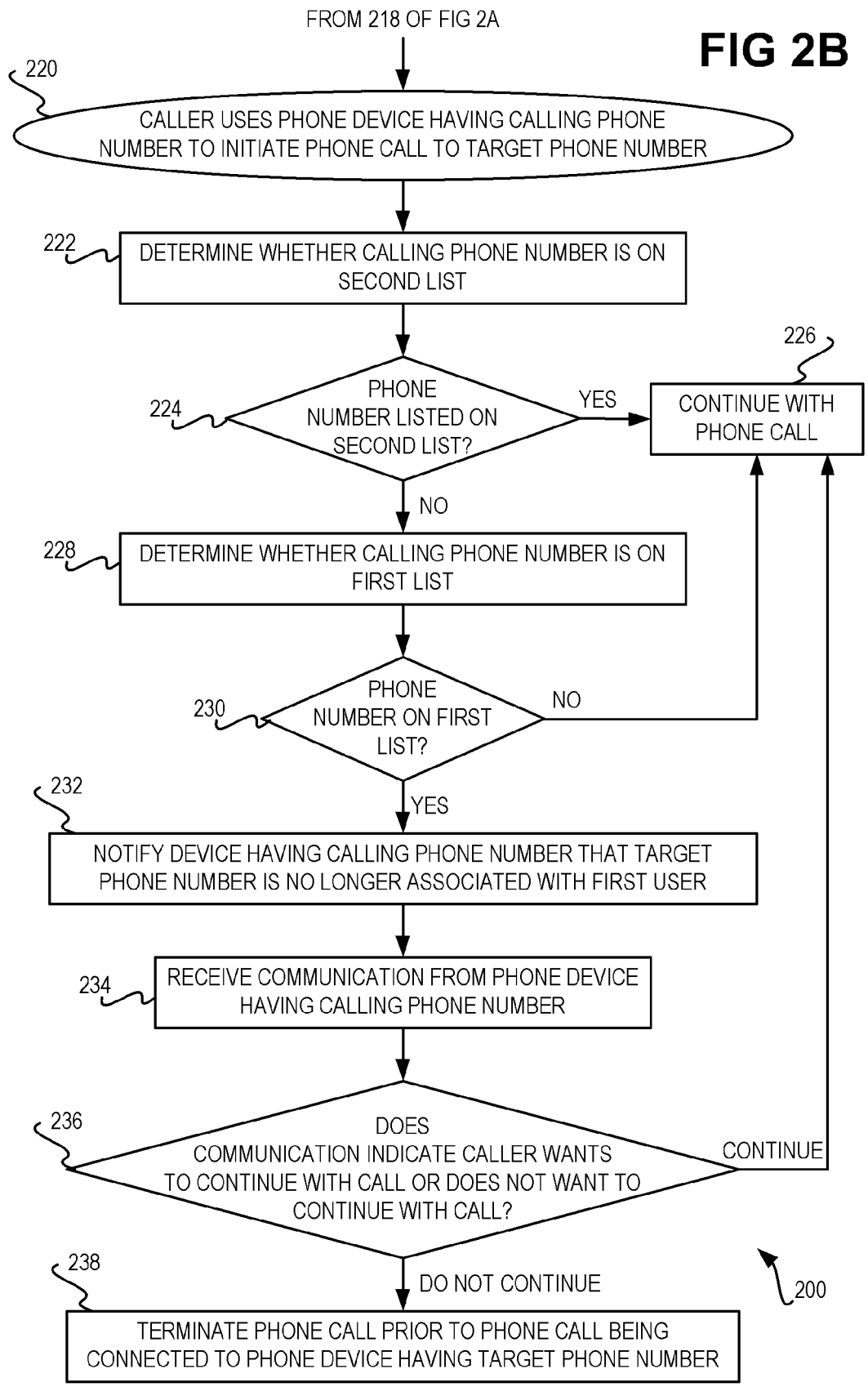

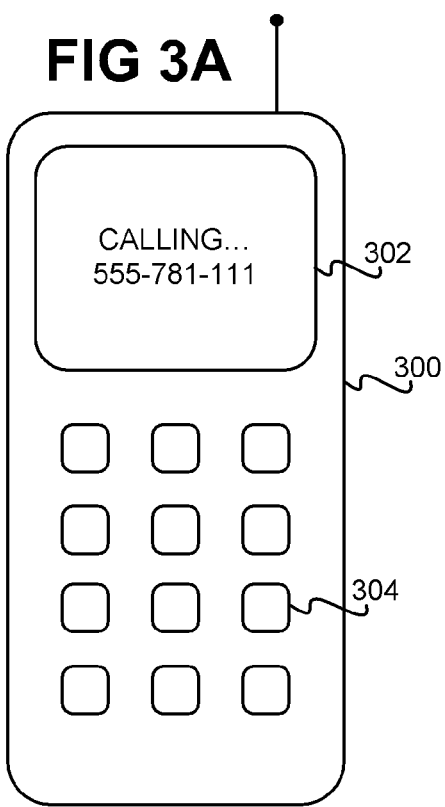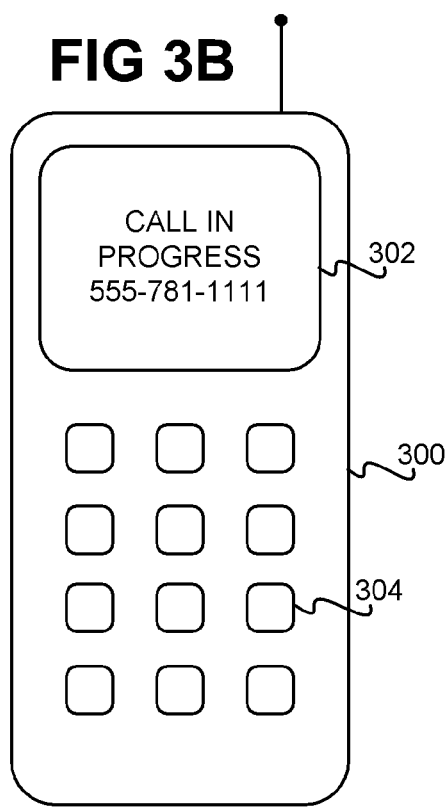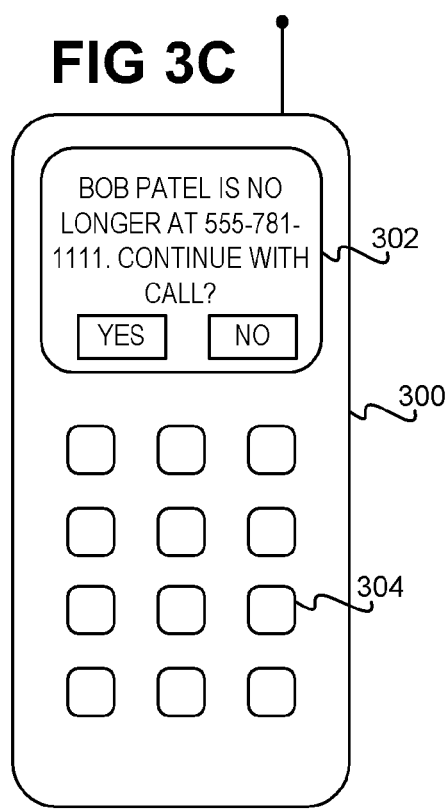

//PHONE CALL SCREENING

FIELD OF THE INVENTION

The present invention relates generally to screening phone calls, and more particularly to screen phone calls where a user has a phone number that was previously associated with a different user.

BACKGROUND OF THE INVENTION

Phone numbers are frequently reused. For instance, a first user may be associated with the first user. The first user may subsequently receive a new phone number, such that he or she is no longer associated with the first user. For example, the first user may have moved to a location with an area code that is different than the area code of the particular phone number, such that he or she gives up the particular phone number to receive a new phone number with the new area code. As another example, the first user may switch telecommunication companies, and may decide to receive a new phone number instead of retaining the particular phone number in question. Because the particular phone number is now available, it may be assigned to a different, second user, such that the particular phone number is now associated with the second user.

However, the first user may not have informed people who would ordinarily call him or her that his or her phone number has changed. Even if the first user does inform these people, they may forget and/or they may not immediately updated their address books with the first user's new phone number. A caller may thus try to reach the first user by calling the particular phone number, even though it is no longer associated with the first user. Rather than the first user answering the phone call, however, the second user might. This situation can be costly: the caller and/or the second user may incur calling time charges for these phone calls. Furthermore, if the second user receives a large number of phone calls intended for the first user, the second user may become frustrated, and stop answering phone calls that are from people and/or from phone numbers with which the second user is not immediately aware.

SUMMARY OF THE INVENTION

The present invention relates generally to improved phone call screening. In a method of an embodiment of the invention, a caller uses a calling phone number to initiate a phone call to a target phone number. The target phone number was previously associated with a first user but is presently associated with a second user. As such, the target phone number is not presently associated with the first user. The method determines whether the calling phone number is on a list of phone numbers associated with the first user. In response to determining that the calling phone number is on this list the method notifies the caller that the target phone number is no longer associated with the first user, and determines whether the caller wants to continue with the phone call. In response to determining that the caller does not want to continue with the phone call, the method terminates the phone call prior to the phone call reaching the second user.

A computer-readable medium of an embodiment of the invention has one or more computer programs stored thereon to perform a method. The computer-readable medium may be a tangible computer-readable medium, such as a recordable data storage medium. A phone device having a calling phone number is used by a caller to initiate a phone call to a target phone number. The target phone number was previously associated with a first user and is presently associated with a second user, such that the target phone number is not presently associated with the first user. The method responsively determines whether the calling phone number is on a list of phone numbers associated with the second user, and if it is not on this list, the method determines whether the calling phone number is on a list of phone numbers associated with the first user.

If the calling phone number is on the list of phone numbers associated with the first user, the method notifies the phone device having the calling phone number that the target phone number is no longer associated with the first user, such that the phone device informs the caller that the target phone number is no longer associated with the first user. In response to receiving communication from the phone device having the calling phone number that the caller does not want to continue with the phone call, the method terminates the phone call. The phone call is terminated prior to the phone call being connected to a phone device having the target phone number that is presently associated with the second user.

A system of an embodiment of the invention includes hardware, and first, second, and third components implemented via the hardware. The first component is to detect that a phone call has been initiated to a target phone number by a caller using a phone device having a calling phone number. The target phone number was previously associated with a first user and is presently associated with a second user, such that it is not presently associated with the first user. The second component is to determine whether the calling phone number is on a first list of phone numbers associated with the first user and/or is on a second list of phone numbers associated with the second user. Where the calling phone number is not on the second list but is on the first list, the third component is to notify the phone device having the calling phone number that the target phone is no longer associated with the first user. The third component is further to determine whether the caller wants to continue with the phone call, and to permit the phone call to continue only if the caller wants to continue with the phone call.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

FIG. 1 is a flowchart of a method, according to an embodiment of the present invention.

FIGS. 2A and 2B are flowcharts of a method, according to another embodiment of the present invention.

FIGS. 3A, 3B, and 3C are diagrams of a representative phone device having a display on which exemplary messages are displayed in accordance with the method of FIGS. 2A and 2B, according to an embodiment of the present invention.

DETAILED DESCRIPTION OF THE INVENTION

Figure 4:
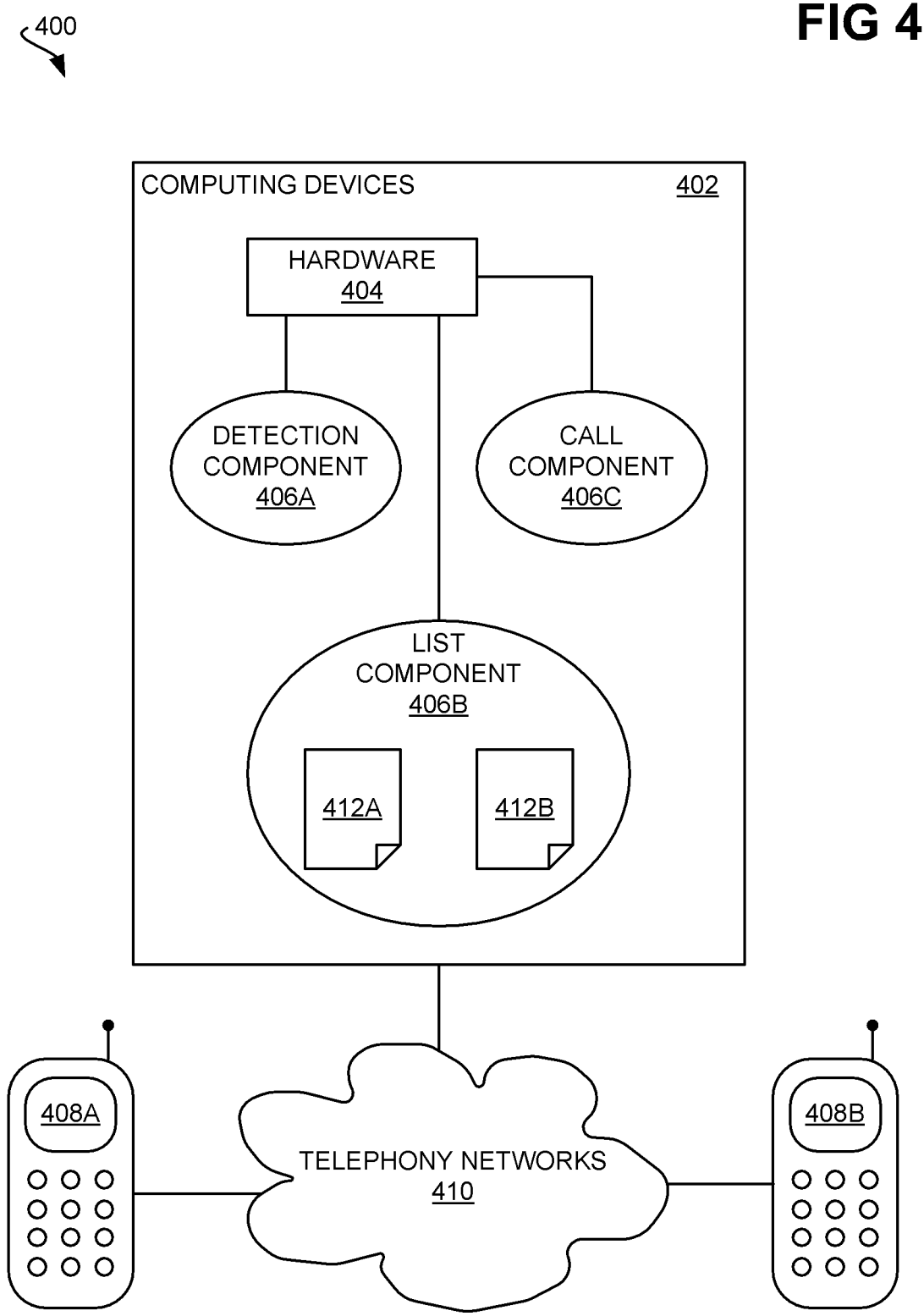
FIG. 4 is a diagram of a system, according to an embodiment of the invention.

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

FIG. 1 shows a method 100, according to an embodiment of the present invention. What is referred to as a target phone number is initially associated with a first user, but becomes associated with a second user such that the target phone number is no longer associated with the first user (102). For example, the first user may initially have (i.e., be associated with) the target phone number, but may give it up when he or she moves or wants a new phone number. As another example, the first user may switch telecommunications companies, and may decide to get a new phone number instead of porting the target phone number to the new telecommunications company. As such, the target phone number becomes available, and is reused by becoming associated with the second user. For example, the second user may have wanted a new phone number, and may have been assigned the target phone number.

A caller, such as a user other than the first and the second users, uses his or her own calling phone number to initiate a phone call to the target phone number (104). For example, the caller uses a phone device having the calling phone number to initiate the phone call. The phone call is intended to reach the first user. For instance, the caller may not be aware that the first user has changed his or her phone number, and thus may have dialed the target phone number with the intention of reaching the first user on the phone. The method 100 determines whether the calling phone number of the caller is on a list of phone numbers associated with the first user (106). A particular embodiment of such a list of phone numbers is described later in the detailed description.

If the calling phone number is not on the list (108), then the phone call continues (110). That is, the phone call is permitted to reach the second user. For instance, a phone device of the second user may ring to alert the second user that there is an incoming call, and caller identification ("ID") may show the calling phone number and/or the name of the caller. In the particular case where the method 100 proceeds to part 110 from part 108, the phone call is continued without any further interaction by the caller after the caller has dialed the target phone number, or otherwise has initiated the phone call to the target phone number, in part 104. The caller is further not informed that his or her calling phone number has been checked against the list of phone numbers associated with the first user, in part 106. That is, from the caller's perspective, he or she dialed the target phone number, and the call went through to a phone device having this phone number, as is normally achieved.

However, if the calling phone number is on the list (108), then the caller is notified that the target phone number is no longer associated with the first user (112). For instance, this information may be displayed to the caller on the phone device having the calling phone number that the caller used to place or initiate the phone call in question. The method 100 also determines whether the caller wants to continue with the phone call (114). For example, the caller may be prompted on his or her phone device as to whether the phone call should continue through to the phone device having the target phone number (and which is presently associated with the second user). In response, the caller may press one button on the phone device to indicate that he or she still wants to continue with the phone call, and another button to indicate that he or she does not want to continue with the phone call.

If the caller wants to continue with the phone call (116), then the phone call continues (110). In the particular case where the method 100 proceeds to part 110 from part 116, the caller has had to provide further interaction after having initially placed the phone call or otherwise after having initiated the phone call in part 104. As noted in the previous paragraph, that is, the caller has had to indicate whether or not he or she wants to continue with the phone call. By comparison, if the caller does not want to continue with the phone call (116), then the phone call is terminated prior to reaching the second user (118). Thus, the second user never becomes aware that the caller has initiated the phone call, because, for instance, the phone call has not reached the phone device having the target phone number. As such, the second user is not informed of the phone call, and because the phone call never reaches the phone device having target phone number, the second user is never permitted to answer the phone call.

FIGS. 2A and 2B show a method 200, according to another embodiment of the present invention. Referring first to FIG. 2A, a target phone number is initially associated with a first user (202). More specifically, a phone device of the first user is said to have the target phone number. As such, when the target phone number is called, this phone device rings, and permits the first user to answer the phone call to complete the call. The phone device may also be employed to place phone calls, where the target phone number may be displayed on the caller ID of the receiving phone device having the phone number that has been called.

A first list of phone numbers, associated with the first user, is maintained (204). To implement part 204, in one embodiment part 206, part 208, and/or parts 210, 212, and 214 may be performed. Generally, the phone numbers used to make phone calls to the target phone number are stored within this first list, and/or the phone numbers to which the target phone number is used to make phone numbers are stored within this first list (206). A calling phone number is used to make a phone call to the target phone number in that a phone device having the calling phone number is used to call the target phone number. Similarly, the target phone number is used to make a phone call to a calling phone number in that the phone device having the target phone number is used to call the calling phone number.

The first list of phone numbers may be able to store just a predetermined maximum number of phone numbers. Therefore, where the number of phone numbers stored within the first list exceeds a predetermined threshold, the least recently added phone number (i.e., the oldest phone number) can be deleted from the first list (208), in a first-in, first-out (FIFO) manner. For example, the first list may be able to store N phone numbers. When N phone numbers have been stored within the first list, and a new phone number is to be stored within the list, the least recently added phone number (i.e., the oldest phone number) is first removed from the list before the new phone number is added to the list.

In one embodiment, when a selected phone number is to be added to the first list of phone numbers, if this phone number is not already within the first list, then both the selected phone number and the current date are stored within the first list (210). By comparison, when a selected phone number is to be added to the first list of phone numbers, and if this phone number is already within the first list, then the date for the selected phone number as stored within the list is updated with the current date (212). For the purposes of part 208, then, the date when a phone number is added to the first list is the date when the phone number was first added to this list, or when the date for the phone number as stored within the list was updated with the current date. Thus, the oldest phone number (i.e., the least recently added phone number) within the first list is the phone number having the oldest date.

Furthermore, any phone number that is more than a predetermined number of days from the current date (i.e., more than a predetermined number of days old) may be removed from the first list (214). For example, if a calling phone number was most recently used to call the target number more than M days from the current date, then the calling phone number is removed from the first list. In this way, it can be assured that the phone numbers stored within the first list associated with the first user are "fresh" phone numbers that have been relatively recently used in relation to phone calls from or to the target phone number.

At some point, the target phone number is no longer associated with the first user, and instead becomes associated with a second user (216). As has been described above, the first user may give up the target phone number, such that it becomes available, and then later the newly available target phone number may be assigned to the second user. As before, more specifically, a phone device of the second user is said to have the target phone number. As such, when the target phone number is called, this phone device may ring, and the second user is permitted to answer the phone call to complete the call. The phone device may also be used to place phone calls, where the target phone number may be displayed on the caller ID of the receiving device having the phone number that has been called.

A second list of phone numbers associated with the second user is also maintained (218). This second list can be maintained in the same way that the first list of phone numbers is maintained, as has been described in relation to part 204. It is noted that the second list of phone number is, however, a different list than the first list of phone numbers, although one or more of the phone numbers stored in the second list may be identical to those that have been stored in the first list.

Referring next to FIG. 2B, a caller uses a phone device having a calling phone number to initiate a phone call to the target phone number that is now associated with the second user (220). FIG. 3A shows a representative example of a phone device 300 having a calling phone number being used to initiate a phone call to the target phone number, according to an embodiment of the present invention. The phone device 300 has a display 302 and a number of buttons 304. The caller uses the buttons to enter in the target phone number, which for example purposes is 555-781-1111. On the display 302, the phone device 300 has displayed "CALLING . . . 555-781-1111" to indicate to the caller that the phone device 300 is initiating or placing a phone call to the target phone number in question.

Referring back to FIG. 2B, it is determined whether the calling phone number of the phone device that the caller is using to place a phone call to the target phone number is on the second list of phone numbers associated with the second user (222). If the calling phone number is on the second list (224), then the phone call is permitted to automatically continue (226). This is achieved without any further interaction by the caller with the phone device having the calling phone number, beyond the initial button pressing that the caller performed to initially dial the target phone number or otherwise cause the phone device to initiate the phone call. The phone call is permitted to be connected to the phone device having the target phone number presently associated with the second user, and this phone device may ring to permit the second user to answer the phone call. It is noted that the phone device of the caller that has the target phone number is not notified that the calling phone number has been checked against the second list. As such, the caller may not be aware that such checking of his or her calling phone number against the second list associated with the second user has even been performed.

Thus, because the calling phone number is on the second list of phone numbers associated with the second user, it can be concluded that there has been a relatively recent phone call between the caller and the second user using the calling phone number (by the caller) and the target phone number (by the second user). As such, the inference that is drawn is that the caller is attempting to reach the second user at the target phone number. It is noted that the method 200 proceeds to part 226 from part 224 without checking the calling phone number of the caller against the first list of phone numbers associated with the first user. This is because in this embodiment, it is presumed that if the calling phone number of the caller is present on the second list, such presence is sufficient to conclude that the caller is aware that the target phone number has been reassigned from the first user to the second user—even if the caller previously called the first user at the target phone number (i.e., even if the calling number were on the first list).

FIG. 3B shows exemplary performance of part 224 as to the phone device 300 after the caller has initiated the phone call with the target phone number, according to an embodiment of the present invention. It is presumed in this example that the second user has answered the phone call initiated by the caller on the phone device 300. The phone device 300 may display a message such as "CALL IN PROGRESS 555-781-1111" on the display 302 to indicate to the caller that the second user has answered the phone call. A timer may be displayed on the display 302 to indicate the amount of time that has elapsed after the second user has answered the phone call; the timer may alternatively indicate the amount of time that has elapsed after the caller first initiated the phone call.

Referring back to FIG. 2B, if the calling phone number of the caller is not on the second list associated with the second user (224), then it is determined whether the calling phone number is on the first list of phone numbers associated with the first user (228). If the calling phone number is not on the first list (230), then the phone call is again permitted to automatically continue (226). As before, this is achieved without any further interaction by the caller with the phone device having the calling phone number, beyond the initial button pressing that the caller performed to initially dial the target phone number or otherwise cause the phone device to initiate the phone call. The phone call is permitted to be connected to the phone device having the target phone number presently associated with the second user, and this phone device may ring to permit the second user to answer the phone call. It is noted that the phone device of the caller that has the target phone number is not notified that the calling phone number has been checked against the first and the second lists of phone numbers. As such, the caller may not be aware that such checking of his or her calling phone number against the first and second lists has even been performed.

Thus, because the calling phone number is not on either the second list of phone numbers associated with the second user or the first list of phone numbers associated with the first user, no conclusion can be drawn as to whether the caller having the calling phone number is attempting to reach the first user or is attempting to reach the second user in calling the target phone number. Therefore, in this embodiment the choice that is made in proceeding from part 230 to part 226 permits the phone call to automatically continue. If this choice were not made, then there is indeed no reason to maintain the first list of phone numbers associated with the first user. However, this alternative is less than desirable, because it may effectively mean that any time a caller attempts to reach the second user at the target phone number using a calling phone number for the first time, the phone call is not automatically connected to the phone device having the target phone number associated with the second user. The embodiment depicted in FIG. 2B avoids this scenario, by ensuring that if the calling phone number is not on either the second list or the first list, it is presumed that the caller is attempting to reach the second user in calling the target phone number.

Continuing with the method 200 of FIG. 2B, if the calling phone number is not on the second list associated with the second user (224), but is on the first list associated with the first user (230), then the phone device of the caller that has the calling phone number is notified that the target phone number is no longer associated with the first user (232). As such, this phone device informs the caller that the target phone number is no longer associated with the first user, such as by displaying this information for viewing by the caller. The caller is also queried by his or her phone device as to whether he or she wishes to continue with the phone call, even though the target phone number is no longer associated with the first user.

Because the calling phone number is not on the second list of phone numbers associated with the second user, it can be concluded that there have been no relatively recent phone calls between the caller and the second user using the calling phone number (by the caller) and the target phone number (by the second user). Furthermore, because the calling phone number is on the first list of phone numbers associated with the first user, it can be concluded that there has been a phone call between the caller and the first user using the calling phone number (by the caller) and the target phone number (by the second user). As such, the inference that is drawn is that the caller is attempting to reach the first user at the target phone number, even though the target phone number is no longer associated with the first user and instead is now associated with the second user.

FIG. 3C shows exemplary performance of part 232 as to the phone device 300, according to an embodiment of the present invention. It is presumed in this example that the name of the first user with which the target phone number 555-781-1111 was previously associated is Bob Patel. Thus, the phone device 300 displays on its display 302 the message "BOB PATEL IS NO LONGER AT 555-781-1111. CONTINUE WITH CALL?". The phone device 300 also displays two soft buttons on the display 302, a YES button and a NO button. If the caller wishes to continue with the phone call, even though the first user Bob Patel no longer has the target phone number 555-781-1111, he or she presses the button 304 associated with the YES button. By comparison, if the caller does not wish to continue with the phone call, perhaps because this first user no longer has the target phone number, for example, he or she pressed the button 304 associated with the NO button.

Referring back to FIG. 2B, a communication is received from the phone device of the caller with which the calling phone number is associated (234). This communication indicates whether the caller does want to continue with the phone call, or does not want to continue with the phone call. If the caller wants to continue with the phone call (236), then the phone call is continued (226), such that the phone call is permitted to be connected to the phone device having the target phone number presently associated with the second user.

However, performance of part 226 due to the method 200 proceeding from part 236 does not result in automatically continuing the phone call without interaction by the caller. Rather, after having initiated the phone call to the target phone number in part 220, the caller has also had to indicate that he or she wishes to continue with the phone call, as has been described in relation to FIG. 3C. The phone call is permitted to be connected to the phone device having the target phone number currently associated with the second user in that it can be said that the phone call between the calling phone number and the target phone number is completed, such that the target user has the opportunity to answer the phone call. For example, the phone device having the target phone number may ring or otherwise alert the second user to the incoming phone call from the caller.

By comparison, if the communication received from the phone device of the caller with which the calling phone number is associated indicates that the caller does not want to continue with the phone call (236), then the phone call is terminated (238). The phone call is terminated without the phone call ever having been connected to the phone device having the target phone number with which the second user is presently associated. As such, the phone device having the target phone number is not informed or notified that a phone call was ever initiated to the target phone number by the caller, such that the second user is not given the opportunity to answer the phone call using the phone device having the target phone number.

In this respect, embodiments of the invention can provide for advantages over the prior art. Both the caller and the second user may not be subject to calling time charges for phone calls placed from the calling phone number to the target phone number, where the caller terminates the phone calls as has been described in relation to FIG. 3C. Furthermore, because such terminated phone calls do not ring at the phone device of the second user with which the target phone number is associated, the second user may avoid the frustration of having to answer phone calls that are intended for the first user, instead of for the second user.

FIG. 4 shows a system 400, according to an embodiment of the invention. The system 400 can be or include one or more computing devices 402. The computing devices 402 include hardware 404, such as processors, memory, storage devices, peripheral devices, communication and networking devices, and other types of hardware. A detection component 406A, a list component 406B, and a call component 406C, collectively referred to as the components 406, are each implemented via the hardware 404. For instance, each of the components 406 may be software, such as one or more computer programs, that are run on the hardware 404 of the computing devices 402. Generally, the components 406 at least partially perform and/or implement the methods 100 and 200 that have been described.

The computing devices 402 are communicatively connected to a phone device 408A and a phone device 408B, collectively referred to as the phone devices 408, over one or more telephony networks 410. The phone devices 408 may each be a corded telephone, a cordless telephone, a mobile or cellular phone, or another type of device having phone functionality. Phone functionality can be considered as the ability to receive phone calls and/or as the ability to place phone calls.

The telephony networks 410 can be or include the public switching telephony network (PSTN), cellular telephony networks, private branch exchange (PBX) networks, Internet telephony networks (e.g., voice-over-Internet protocol, or VOIP, networks), mobile telephony networks, and/or other types of telephony networks. As such, the computing devices 402 may be controlled by, situated at, or managed for a variety of different types of service providers. For example, the computing devices 402 may be located at a landline telephony provider, such as a provider that provides PSTN landline local-and/or long-distance services, at a mobile or a cellular telephony provider, at an Internet telephony provider, or event at a private company in the case of a PBX network, among other types of telephony providers.

The phone device 408A has the calling phone number associated with the caller as has been described, whereas the phone device 408B has the target phone number that is presently associated with the second user as has been described. The caller uses the phone device 408A to initiate a phone call to the target phone number of the phone device 408A and that is presently associated with the second user. Before the phone call is permitted to be completed between the phone devices 408, however, the computing devices 402 effectively intercept the phone call, and determine whether the phone call should be permitted to continue or be terminated.

More specifically, the detection component 406A detects that the phone call has been initiated. The list component 406B maintains a first list of phone numbers 412A associated with the first user as has been described, as well as a second list of phone numbers 412B associated with the second user as has been described, where the lists 412A and 412B are collectively referred to as the lists 412. In response to the detection component 406A detecting that the phone call has been initiated, the detection component 406A passes the calling phone number of the phone device 408A to the list component 406B. The list component 406B in turn determines whether the calling phone number of the phone device 408A is on the first list 412A, and also determines whether the calling phone number of the phone device 408A is on the second list 412B, as has been described.

The list component 406B passes the information as to whether the calling phone number of the phone device 408A is on the first list 412A, and whether the calling phone number is on the second list 412B, to the call component 406C. Where the calling phone number is not on the second list 412B but is on the first list 412A, the call component 406C notifies the phone device 408A that the target phone number is no longer associated with the first user. In this situation, the call component 406C determines whether the caller operating the phone device 408A wants to continue with the phone call, such as by receiving communication from the phone device 408A as has been described. Also in this situation, the call component 406C permits the phone call to continue to the phone device 408B only where the caller has expressly indicated that he or she wants to continue with the phone call. Where the caller has indicated that he or she does not want to continue with the phone call, the call is terminated.

Where the calling phone number is not on the second list 412B and is not on the first list 412A, in one embodiment the call component 406C automatically permits the phone call to continue from the phone device 408A to the phone device 408B, as has been described. Likewise, where the calling phone number is on the second list 412B—and regardless of whether the calling phone number is on the first list 412A—in one embodiment the third component 406A also automatically permits the phone call to continue from the phone device 408A to the phone device 408B, as has been described. In this way, then, the components 406 can be said to perform or otherwise implement the methods 100 and 200 that have been described.

Embodiments of the invention have been described that provide for improved phone call screening as compared to the prior art. It is noted that a telephony provider may provide the phone call screening as has been described herein for a given length of time after a first user has given up a target phone number and/or after a second user has then been assigned the target phone number. The telephony provider may provide the service free of charge, and/or may charge for the service. For example, the telephony provider may offer the service for free for a limited time, and thereafter charge either the first user or the second user (or even the caller) a fee on a periodic or on a per-call basis.

It is finally noted that, although specific embodiments have been illustrated and described herein, it can be appreciated by those of ordinary skill in the art that any arrangement calculated to achieve the same purpose may be substituted for the specific embodiments shown. This application is intended to cover any adaptations or variations of embodiments of the present invention. Therefore, it is manifestly intended that this invention be limited only by the claims and equivalents thereof.

For example, embodiments of the present invention have been described in which the caller is notified that the target phone number is no longer associated with the first user, and the caller is given the opportunity as to whether to continue the phone call to the target phone number that is now associated with the second user. However, in another embodiment, the caller may be given the opportunity to have the phone call instead placed to the new phone number associated with the first user. For example, the phone device of the caller may display "BOB PATEL IS NOW AT 555-781-2222" and "CALL THIS NUMBER INSTEAD?". If the caller indicates affirmation, then the phone call initiated at the phone device of the caller is routed to the first user's new phone number, instead of to the target phone number associated with the second user.

By comparison, if the user indicates negation, then the caller may indicate whether or not to continue with the phone call to the target phone number, as in part 114 of FIG. 1 and as in part 234 of FIG. 2B. In this embodiment, then, the caller is afforded the opportunity to route his or her phone call to the first user's new phone number. Additionally or alternative, if the caller does not wish to route the phone call to the first user's new phone number, the caller may still permit the phone call to continue to the target phone number (now associated with the second user), or terminate the phone call completely.

We claim:

1. A non-transitory computer-readable medium having one or more computer programs stored thereon to perform a method comprising:

in response to a phone device having a calling phone number being used by a caller to initiate a phone call to a target phone number, the target phone number previously associated with a first user and presently associated with a second user such that the target phone number is not presently associated with the first user, determining whether the calling phone number is on a list of phone numbers associated with the second user, the list of phone numbers associated with the second user being a second list;

in response to determining that the calling phone number is not on the list of phone numbers associated with the second user, determining whether the calling phone number is on a list of phone numbers associated with the first user, the list of phone numbers associated with the first user being a first list;

in response to determining that the calling phone number is on the list of phone numbers associated with the first user, notifying the phone device having the calling phone number that the target phone number is no longer associated with the first user such that the phone device informs the caller that the target phone number is no longer associated with the first user;

in response to receiving communication from the phone device having the calling phone number that the caller does not want to continue with the phone call, terminating the phone call prior to the phone call being connected to a phone device having the target phone number presently associated with the second user; and in response to determining that the calling phone number is on the list of phone numbers associated with the second user, automatically continuing with the phone call without any further interaction by the caller with the phone device having the calling phone number such that the phone call is permitted to be connected to the phone device having the target phone number presently associated with the second user, and such that the phone device having the calling phone number is not notified that the calling phone number has been checked against the list of phone numbers associated with the second user, wherein the second list is always examined to determine whether the calling phone number is thereon prior to the first list being examined to determine whether the calling phone number is thereon, and the first list is not examined to determine whether the calling phone number is thereon where the calling phone number has been determined to be on the second list, such that the first list is only examined to determine whether the calling phone number is thereon where the calling phone number has been determined to not be on the second list.

2. The non-transitory computer-readable medium of claim 1, the method further comprising, in response to determining that the calling phone number is not on the list of phone numbers associated with the second user, in response to determining that the calling phone number is on the list of phone numbers associated with the first user, in response to receiving communication from the phone device having the calling phone number that the caller wants to continue with the phone call, continuing with the phone call such that the phone call is permitted to be connected to the phone device having the target phone number presently associated with the second user.

3. The non-transitory computer-readable medium of claim 1, the method further comprising, in response to determining that the calling phone number is not on the list of phone numbers associated with the second user, and in response to determining that the calling phone number is not on the list of phone numbers associated with the first user, automatically continuing with the phone call without any further interaction by the caller with the phone device having the calling phone number such that the phone call is permitted to be connected to the phone device having the target phone number presently associated with the second user, and such that the phone device having the calling phone number is not notified that the calling phone number has been checked against the list of phone numbers associated with the second user and against the list of phone numbers associated with the first user.

4. The non-transitory computer-readable medium of claim 1, the method further comprising, while the target phone number is associated with the first user, maintaining the list of phone numbers associated with the first user by one or more of:

storing each phone number of a plurality of phone numbers that are used to make phone calls to the target phone number within the list of phone numbers associated with the first user; and, storing each phone number of a plurality of phone numbers to which the target phone number is used to make phone calls within the list of phone numbers associated with the first user.

5. The non-transitory computer-readable medium of claim 4, wherein maintaining the list of phone numbers associated with the first user comprises:

where a number of phone numbers stored within the list of phone numbers associated with the first user exceeds a predetermined threshold, removing a selected phone number from the list of phone numbers associated with the first user having been least recently added to the list of phone numbers associated with the first user.

6. The non-transitory computer-readable medium of claim 4, wherein maintaining the list of phone numbers associated with the first user comprises:

when a selected phone number is to be added to the list of phone numbers associated with the first user, where the selected phone number is not already present within the list of phone numbers associated with the first user, storing the selected phone number and a current date within the list of phone numbers associated with the first user;

where the selected phone number is already present within the list of phone numbers associated with the first user, updating a date for the selected phone number as stored within the list of phone numbers with the current date; and, removing any phone number from the list of phone numbers associated with the first user for which a date is stored within the list of phone numbers associated with the first user that is more than a predetermined number of days from the current date.

7. The non-transitory computer-readable medium of claim 1, the method further comprising, while the target phone number is associated with the second user, maintaining the list of phone numbers associated with the second by one or more of:

storing each phone number of a plurality of phone numbers that are used to make phone calls to the target phone number within the list of phone numbers associated with the second user; and, storing each phone number of a plurality of phone numbers to which the target phone number is used to make phone calls within the list of phone numbers associated with the second user.

8. The non-transitory computer-readable medium of claim 7, wherein maintaining the list of phone numbers associated with the second user comprises:

where a number of phone numbers stored within the list of phone numbers associated with the second user exceeds a predetermined threshold, removing a selected phone number from the list of phone numbers associated with the second user having been least recently added to the list of phone numbers associated with the second user.

9. The non-transitory computer-readable medium of claim 7, wherein maintaining the list of phone numbers associated with the second user comprises:

when a selected phone number is to be added to the list of phone numbers associated with the second user, where the selected phone number is not already present within the list of phone numbers associated with the second user, storing the selected phone number and a current date within the list of phone numbers associated with the second user;

where the selected phone number is already present within the list of phone numbers associated with the second user, updating a date for the selected phone number as stored within the list of phone numbers with the current date; and, removing any phone number from the list of phone numbers associated with the second user for which a date is stored within the list of phone numbers associated with the second user that is more than a predetermined number of days from the current date.

10. The non-transitory computer-readable medium of claim 1, wherein terminating the phone call comprises terminating the phone call such that the phone device having the target phone number is not informed of the phone call, and such that the second user is not permitted to answer the phone call using the phone device having the target phone number.

11. A system comprising:
hardware; and,
a first component implemented via the hardware to detect that a phone call has been initiated to a target phone number by a caller using a phone device having a calling phone number;
a second component implemented via the hardware to determine whether the calling phone number is on a first list of phone numbers associated with a first user, and to determine whether the calling phone number is on a second list of phone numbers associated with a second user;
a third component implemented via the hardware to:
where the calling phone number is not on the second list of phone numbers and is on the first list of phone numbers, notify the phone device having the calling phone number that the target phone number is no longer associated with the first user, to determine whether the caller wants to continue with the phone call, and to permit the phone call to continue only where the caller wants to continue with the phone call; and
where the calling phone number is on the second list of phone numbers, regardless of whether the calling phone number is on the first list of phone numbers, automatically continue the phone call without any further interaction by the caller with the phone device having the calling phone number such that the phone call is permitted to be connected to a phone device having the target phone number presently associated with the second user, such that the phone device having the calling phone number is not notified that the calling phone number has been checked against the first list of phone numbers and against the second list of phone numbers
wherein the target phone number is presently associated with the second user such that the target phone number is not presently associated with the first user, and the target phone number was previously associated with the first user,
and wherein the second list is always examined to determine whether the calling phone number is thereon prior to the first list being examined to determine whether the calling phone number is thereon, and the first list is not examined to determine whether the calling phone number is thereon where the calling phone number has been determined to be on the second list, such that the first list is only examined to determine whether the calling phone number is thereon where the calling phone number has been determined to not be on the second list.

12. The system of claim 11, wherein the third component is further to:
where the calling phone number is not on the second list of phone numbers and is not on the first list of phone numbers, automatically continue with the phone call without any further interaction by the caller with the phone device having the calling phone number such that the phone call is permitted to be connected to a phone device having the target phone number presently associated with the second user, and such that the phone device having the calling phone number is not notified that the calling phone number has been checked against the first list of phone numbers and against the second list of phone numbers.

13. A method comprising:
in response to a phone device having a calling phone number being used by a caller to initiate a phone call to a target phone number, the target phone number previously associated with a first user and presently associated with a second user such that the target phone number is not presently associated with the first user,
determining whether the calling phone number is on a list of phone numbers associated with the second user, the list of phone numbers associated with the second user being a second list;
in response to determining that the calling phone number is not on the list of phone numbers associated with the second user,
determining whether the calling phone number is on a list of phone numbers associated with the first user, the list of phone numbers associated with the first user being a first list;
in response to determining that the calling phone number is on the list of phone numbers associated with the first user,
notifying the phone device having the calling phone number that the target phone number is no longer associated with the first user such that the phone device informs the caller that the target phone number is no longer associated with the first user;
in response to receiving communication from the phone device having the calling phone number that the caller does not want to continue with the phone call, terminating the phone call prior to the phone call being connected to a phone device having the target phone number presently associated with the second user; and
in response to determining that the calling phone number is on the list of phone numbers associated with the second user,
automatically continuing with the phone call without any further interaction by the caller with the phone device having the calling phone number such that the phone call is permitted to be connected to the phone device having the target phone number presently associated with the second user, and such that the phone device having the calling phone number is not notified that the calling phone number has been checked against the list of phone numbers associated with the second user, wherein the second list is always examined to determine whether the calling phone number is thereon prior to the first list being examined to determine whether the calling phone number is thereon, and the first list is not examined to determine whether the calling phone number is thereon where the calling phone number has been determined to be on the second list, such that the first list is only examined to determine whether the calling phone number is thereon where the calling phone number has been determined to not be on the second list.

* * * * *